(12) United States Patent
Stevens et al.

(10) Patent No.: US 7,902,962 B2
(45) Date of Patent: Mar. 8, 2011

(54) CART-BASED VISIBILITY SYSTEM

(75) Inventors: John K. Stevens, Stratham, NH (US);
Robert J. Griffin, Richmond Hill (CA);
Alexander Tkanchenko, Etobicoke (CA)

(73) Assignee: Visible Assets, Inc., Mississauga, Ontario (CA)

( * ) Notice: Subject to any disclaimer, the term of this patent is extended or adjusted under 35 U.S.C. 154(b) by 0 days.

(21) Appl. No.: 12/642,388

(22) Filed: Dec. 18, 2009

(65) Prior Publication Data

US 2010/0245046 A1 Sep. 30, 2010

Related U.S. Application Data

(63) Continuation of application No. 11/768,702, filed on Jun. 26, 2007, now abandoned.

(60) Provisional application No. 60/805,972, filed on Jun. 27, 2006.

(51) Int. Cl.
*H04Q 5/22* (2006.01)

(52) U.S. Cl. .................................. 340/10.1; 340/572.1

(58) Field of Classification Search ............... 340/572.7, 340/572.8, 10.1; 235/435
See application file for complete search history.

(56) References Cited

U.S. PATENT DOCUMENTS

| | | | |
|---|---|---|---|
| 4,347,501 A * | 8/1982 | Akerberg ................. | 340/539.13 |
| 2004/0164864 A1* | 8/2004 | Chung et al. .............. | 340/572.7 |
| 2005/0242959 A1* | 11/2005 | Watanabe .................. | 340/572.7 |
| 2006/0163350 A1* | 7/2006 | Melton et al. ................ | 235/435 |
| 2006/0232033 A1* | 10/2006 | Pint .............................. | 280/79.2 |

* cited by examiner

*Primary Examiner* — Shirley Lu
(74) *Attorney, Agent, or Firm* — Larson & Anderson, LLC

(57) ABSTRACT

A cart has at least three wheels. It has one or more loop antennas, and a radio transceiver connected with the antennas. The antennas and transceiver operate at a frequency lower than 1 megahertz. The loop antennas are each at least 0.2 square meters in area. The cart is moved to an area such as a room, and the transceiver communicates with various RF tags in the room. Because of the antenna configuration, the portion of spectrum employed, and the power levels used, the cart is able to communicate with most if not all of the RF tags in the room. The cart can then be moved to another area such as another room, and the process repeated. In this way an inventory of tags can be made without expensive permanently installed infrastructure. The system is robust against interferers such as large metal objects and intervening objects.

7 Claims, 9 Drawing Sheets

CART-BASED VISIBILITY SYSTEM

This application claims priority from U.S. application No. 60/805,972, filed Jun. 27, 2006, which application is hereby incorporated herein by reference for all purposes.

BACKGROUND

A corporation keeping track of assets (e.g., desks, chairs, computers) will often try to accomplish this by means of assets tags. Each asset tag is adhesively secured to an asset, and bears a tracking number or bar code or both. Carrying out an inventory is a tedious process, requiring a lot of people and a lot of time. It is unworkable to carry out a building-wide inventory more often than about once a year.

Given the problems with numbered or bar-coded tags, many investigators have tried to keep track of assets using radio tags such as RFID tags. But locating radio tags in a large or multi-room space is not easy. Among the reasons why this is not easy are the following.

Range. Most radio tags work only if the reader is immediately adjacent to the tag. For example, many RFID tags can only be read at a distance of inches. Among the RFID tags that can be read from more than a few inches away, many can only be read from more than a few inches away in the special case where a high-gain antenna is pointed directly at the tag.

Collisions and area reads. Most radio tags simply respond when powered. If many such tags are nearby to each other, all within a reading area of a reader, what generally happens is that all the tags respond simultaneously, and the collision often means that few or none of the tags can actually be read. Complicated collision-avoidance and disambiguation schemes can be attempted but such schemes often do not work well.

Detuning. Many radio tags many recent RFID tags, get detuned if they are nearby to large pieces of metal or other conductors. With many prior-art systems, a detuned tag may be treated as a tag that does not exist, as it will fail to respond to queries.

Skin depth. Many radio tags, especially many recent RFID tags, simply cannot be reached if there are intervening objects blocking the RF signals. The RF signals are unable to pass back and forth through the intervening objects.

Some approaches that have attempted to overcome these problems are prodigiously expensive.

It would thus be extremely desirable to have a reasonably priced system that would permit area reads, over a substantial range (many feet), robust against detuning, and effective even in the face of intervening objects.

SUMMARY OF THE INVENTION

A cart has at least three wheels. It has one or more loop antennas, and a radio transceiver connected with the antennas. The antennas and transceiver operate at a frequency lower than 1 megahertz. The loop antennas are each at least 0.2 square meters in area. The cart is moved to an area such as a room, and the transceiver communicates with various RF tags in the room. Because of the antenna configuration, the portion of spectrum employed, and the power levels used, the cart is able to communicate with most if not all of the RF tags in the room. The cart can then be moved to another area such as another room, and the process repeated. In this way an inventory of tags can be made without expensive permanently installed infrastructure. The system is robust against interferers such as large metal objects and intervening objects.

DETAILED DESCRIPTION

The radio tags employed can, for example, be tags such as those described in U.S. Pat. No. 7,049,963 entitled "Networked RF tag for tracking freight" and assigned to the same assignee as the present invention, which patent is incorporated herein by reference.

The transceiver on the cart can, for example, be a transceiver such as that described in copending US application number [tunable loop], filed ?? and assigned to the same assignee as the present invention, which application is incorporated herein by reference. The transceiver can transmit at, say, a predetermined multiple of 32768 Hertz (the standard watch crystal frequency) such as 65 kHz or 133 kHz. It uses an antenna that a copper coil forming a rectangle 21 inches by 13 inches. The cart may carry three such antennas, each orthogonal to the other two antennas. The transceiver can switch from one antenna to the next, and even if one antenna is not well coupled with a particular tag in a room, very likely one of the other two antennas will turn out to be well coupled with that particular tag.

As described in more detail in the copending application, the transceiver has an antenna tuner which is used in real time to achieve an optimal impedance coupling between the transceiver and the antenna. In addition, in an exemplary embodiment, the transceiver is able to be tuned upwards or downwards from a nominal frequency. By use of the up-tuning and down-tuning, and by use of the antenna tuner, and by use of the several loop antennas, it turns out to be possible to communicate even with "difficult" tags which old prior-art transceivers might not be able to reach. For example if a tag is "detuned" by proximity to a large body of metal, the transceiver described here will likely be able to communicate with the tag where old prior-art transceivers almost certainly would not be able to do so.

Some examples based upon actual signal strength measurements illustrate that the system according to the invention works better than prior-art systems. It will also be appreciated that this knowledge of the manner in which signal strength drops off can permit a cart and transceiver and several antennas to localize a tag in 3-dimensional space about the cart.

Figure 1:
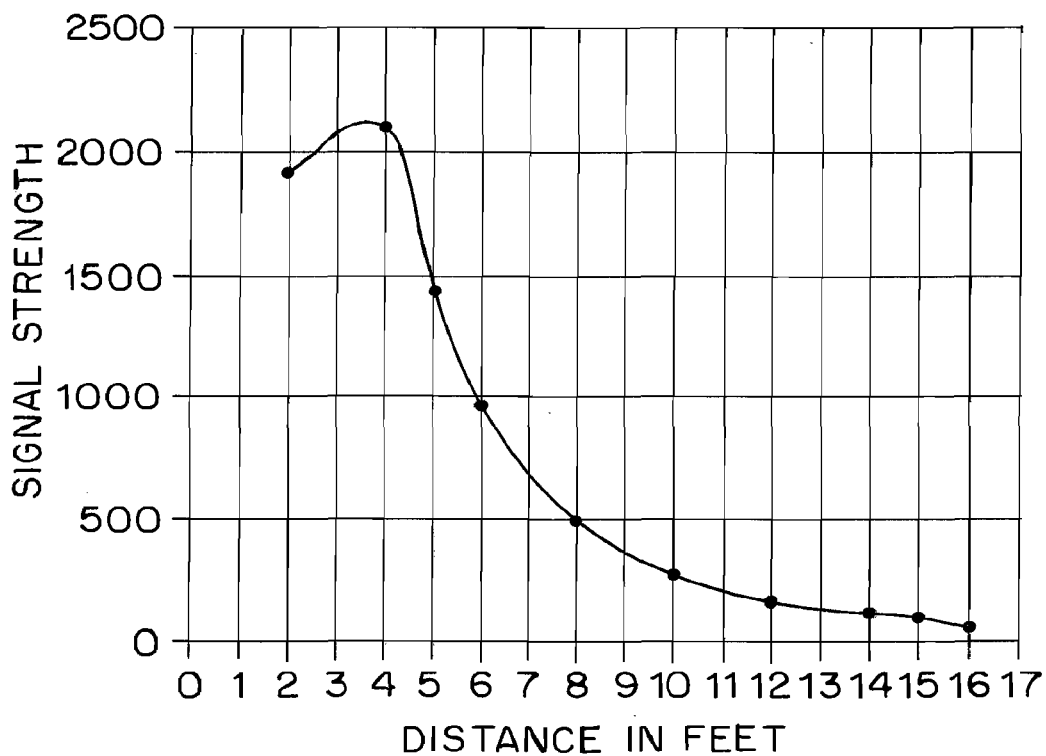
FIG. 1 shows how signal strength drops off with distance.
Figure 2:
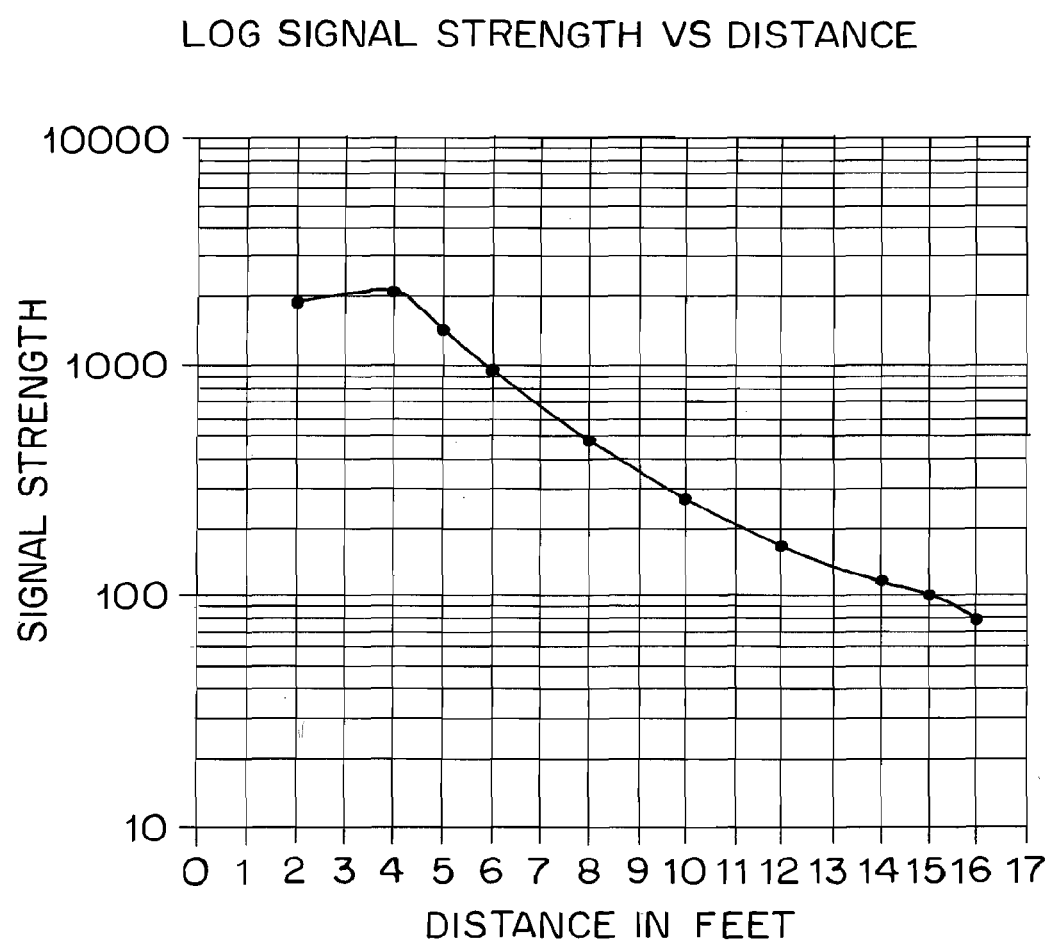
FIG. 2 shows the information of FIG. 1 but on a logarithmic scale.

FIG. 1 shows how signal strength drops off with distance. In this experiment, measurements were made of signal versus distance on the center line of the antenna with the tag axis pointed at the center of the antenna. This experimental result is important for two reasons. First, it shows that it is possible to read a tag even though it is 16 feet away, and in this respect the result is very different from what is obtained with many earlier RFID technologies. Second, it may be appreciated that the received signal strength may be used as an indicator of the distance to the tag. FIG. 2 shows the information of FIG. 1 but on a logarithmic scale. In this experiment and in the ones described below, the antenna was 21 inches by 13 inches, wound on a frame made of polymethyl methacrylate. It turns out that signal strength versus distance for this combination of tag and base station can be very well described by the equation $S=85000/(R^{2.5})$ where R is in feet, with saturation effects occurring between 0 and 5 feet. This may be extended with additional antennas.

Figure 3:
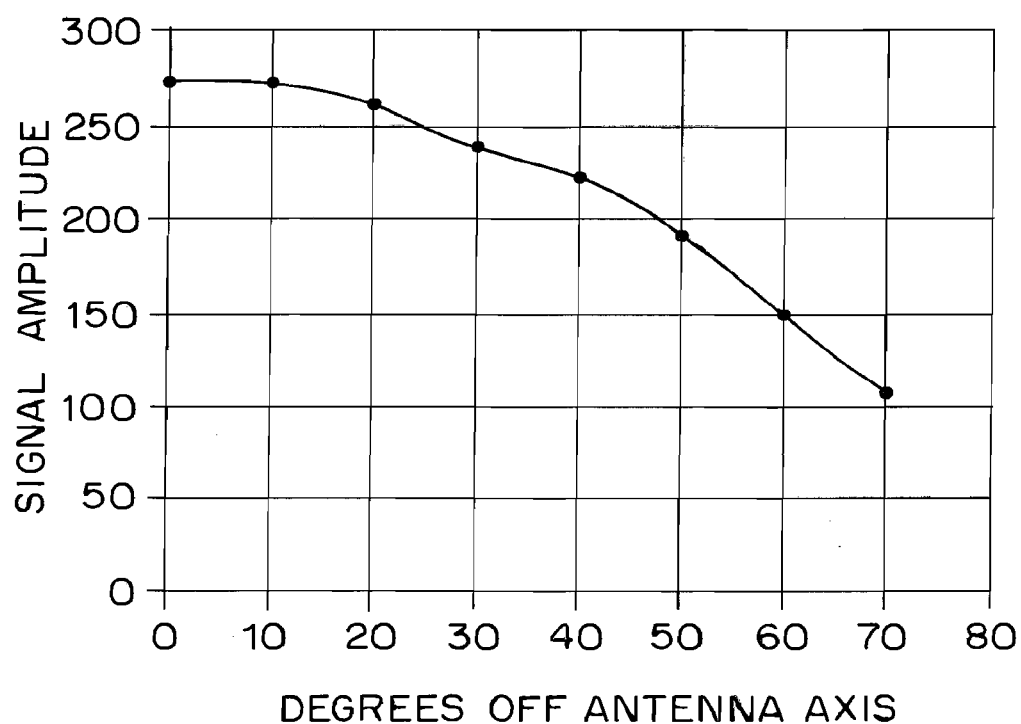
FIG. 3 shows how signal strength drops off as a tag that is ten feet away moves off axis.
Figure 4:
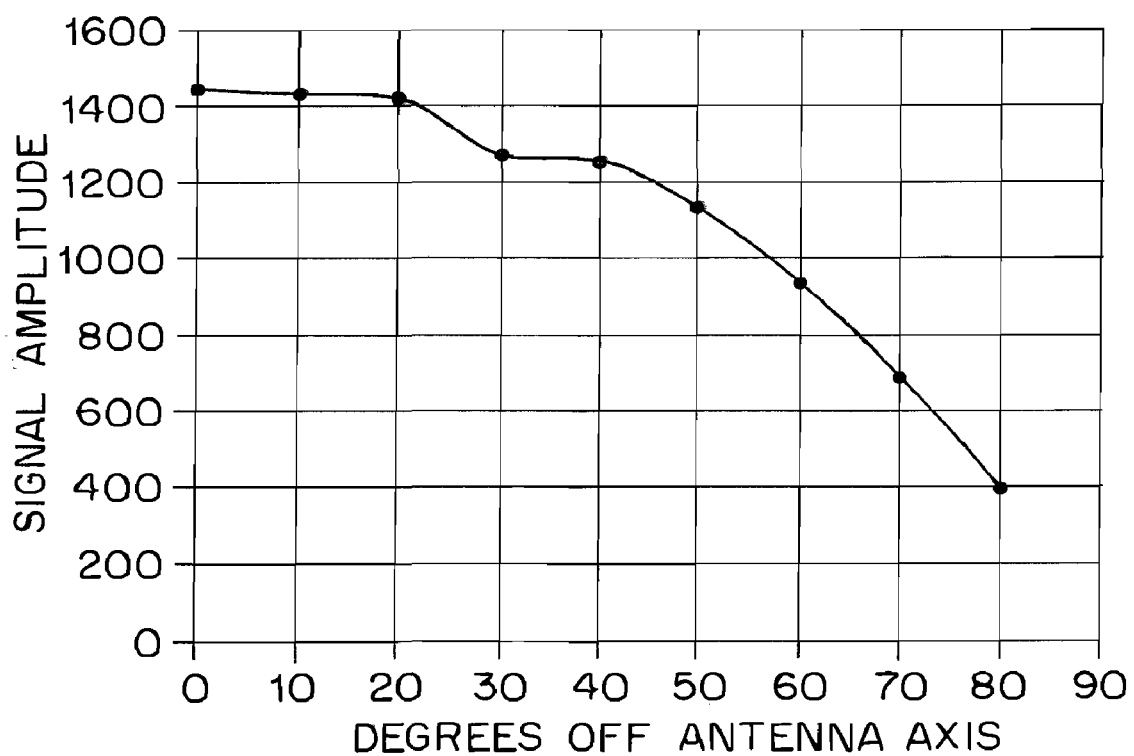
FIG. 4 shows how signal strength drops off as a tag that is five feet away moves off axis.

FIG. 3 shows the results of an experiment in which signal strength measurements were made at the base station (transceiver and antenna which could be on a cart) with the tag on a 10-foot radius arc in front and to the left (CCW) of the antenna. The tag was oriented so that it was at the same height as the antenna and the tag's axis was pointed at the center of the antenna for all readings. This, too, is important for two distinct reasons. First, it shows that it is possible to read a tag even though the tag is far off (as much as 70 degrees) from the antenna axis. In this respect the result is very different from what would be seen with many RFID technologies, where a tag that is ten feet away will simply be unreadable at all even if it is only ten or twenty degrees off the antenna axis. Second, it may be appreciated that the received signal strength may be used as an indicator of the extent to which the tag is off the antenna axis. Similarly, FIG. 4 shows how signal strength drops off as a tag that is five feet away moves off axis.

Figure 5:
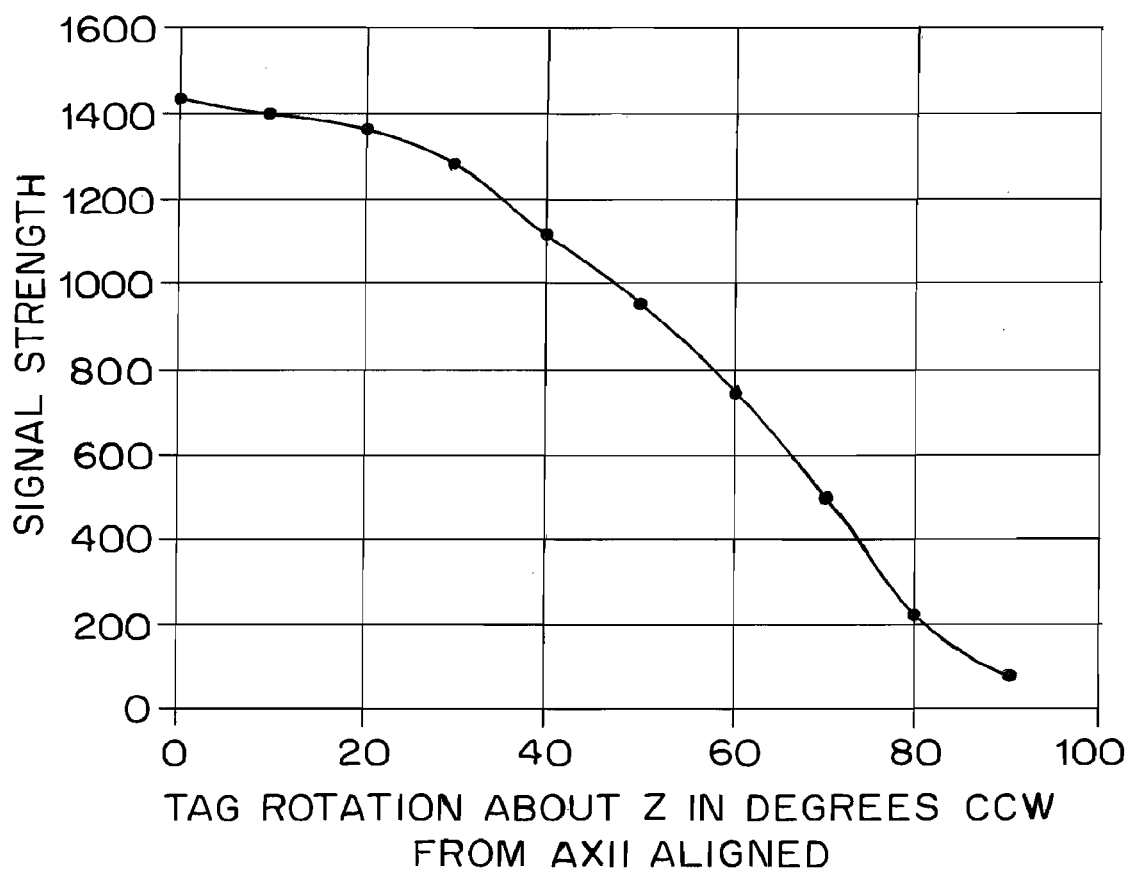
FIG. 5 shows how signal strength drops off as a tag that is five feet away rotates about a Z axis.

FIG. 5 shows how signal strength drops off as a tag that is five feet away rotates about a Z axis. In this experiment, measurements of signal vs rotation of the tag about the Z axis were made with the tag positioned 5 feet from the antenna on the center line and the tag antenna normal axis pointed at the center of the antenna. In this case the tag is on the antenna axis, and the tag rotates about a Z axis, defined as an axis that is perpendicular to the vector normal to the tag. Stated differently, if one draws a line from the antenna to the tag, the Z axis is perpendicular to that line. This is important because it shows that it is possible to read a tag even though the tag is not "facing" the antenna. In contrast, with many RFID technologies, a tag may be read only if it is facing the antenna (or facing directly away from the antenna). Stated differently, the experimental result was that rotation of the tag about its Z axis when the normal vector to its antenna is in the horizontal plane causes a decrease in signal strength read proportional to the cosine of the angle between the tag antenna normal and the field direction.

Figure 6:
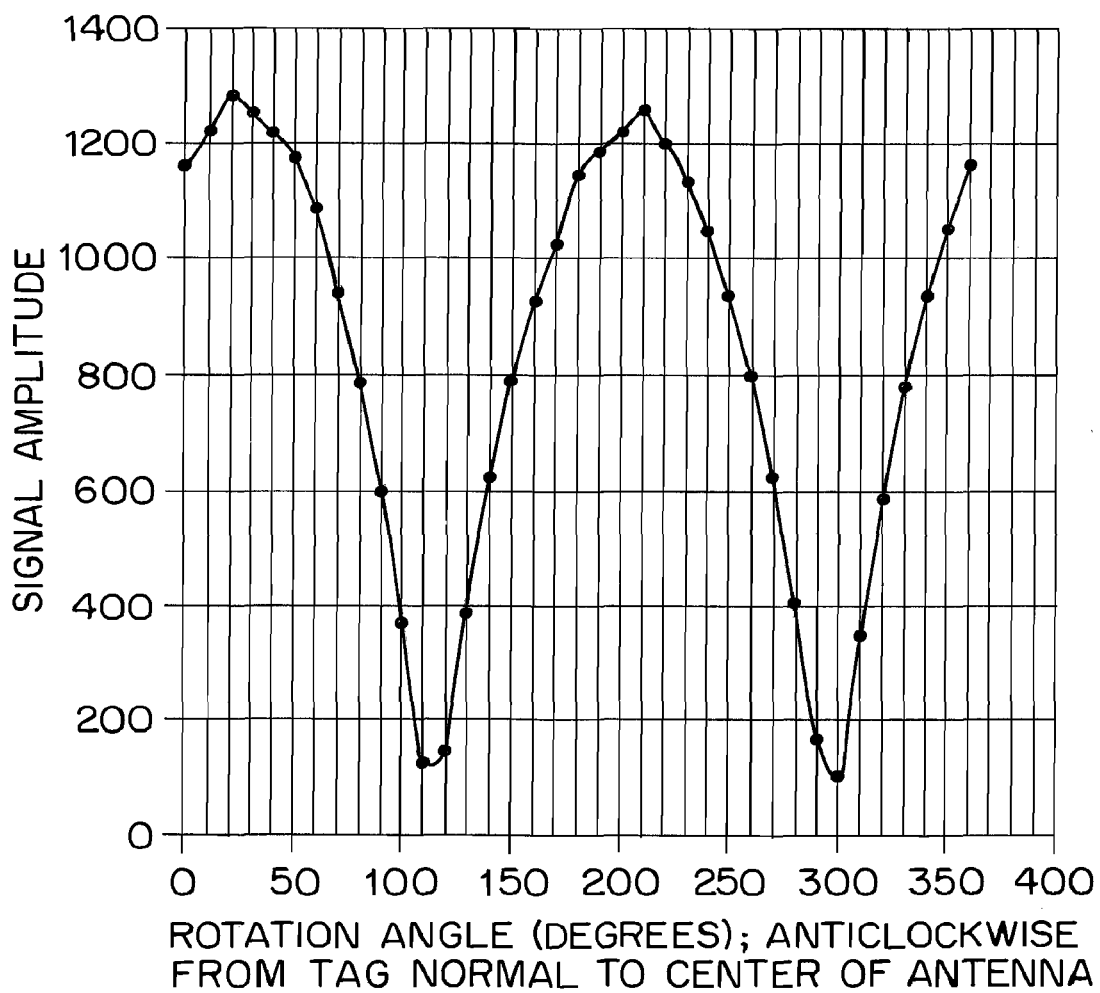
FIG. 6 shows how signal strength drops off as a tag that is five feet away rotates about a Z axis while positioned 45 degrees left of a vector normal to the antenna.

Similarly, FIG. 6 shows how signal strength drops off as a tag that is five feet away rotates about a Z axis while positioned 45 degrees left of a vector normal to the antenna. With the tag located at 5 feet from the antenna and off the antenna axis by 45 degrees CCW, the tag was rotated about its Z axis by a full 360 degrees. The zero-degree point was with the tag antenna's axis pointed directly at the antenna's center. It shows that for many angles the tag can be read, despite being off the antenna normal vector and despite its not facing the antenna. It appears that field lines when the tag is off the antenna's center line are not radial, and in fact with the tag at the 45-degree point 5 feet from the tag, the field is offset 25 degrees from radial.

Figure 7:
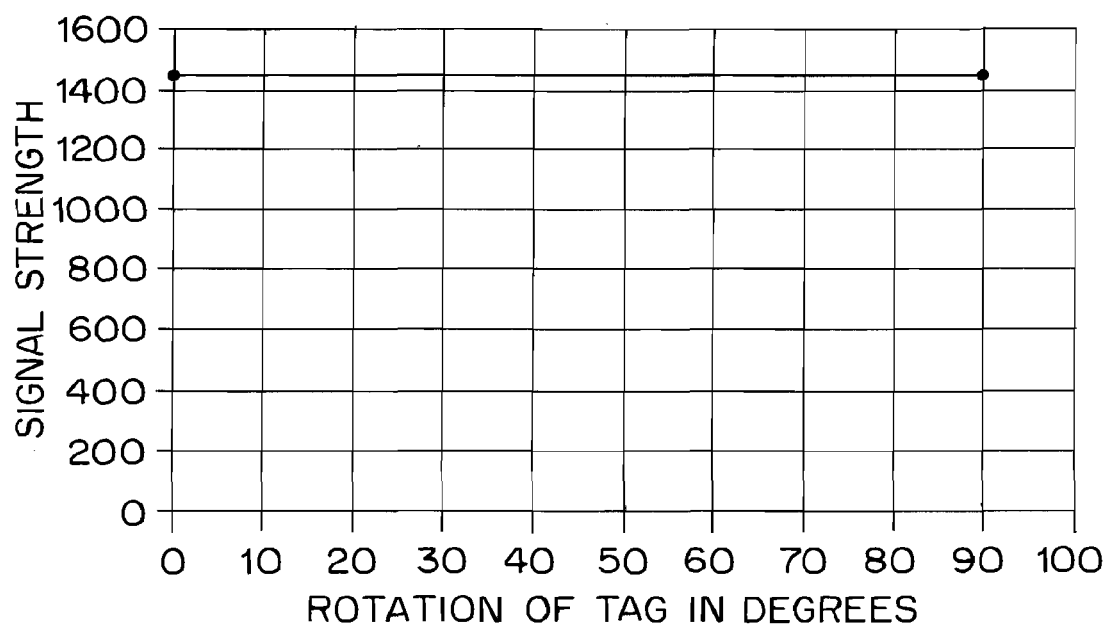
FIG. 7 shows how signal strength changes as a tag that is five feet away rotates about an axis normal to the antenna.

FIG. 7 shows how signal strength changes as a tag that is five feet away rotates about an axis normal to the antenna. With the tag located at 5 feet from the antenna on the antenna's center line, the tag was rotated about the normal vector to the tag's antenna. This shows that so long as the tag faces the antenna, it does not matter if the tag is rotated within the plane of the tag face. Stated differently, rotation of the tag about the normal vector to its antenna doesn't change the signal strength read.

If three antennas are employed, and if the antennas are not all coplanar or parallel to each other, these results indicate that to some extent the received signal strength on the three antennas will permit localizing the tag in three-dimensional space. Preferably the antennas would each be orthogonal to the other two, but orthogonality is not required. (Even if the antennas are not orthogonal, mathematical computations or lookup tables would permit approximating 3-D locations based upon signal strengths.)

Figure 8:
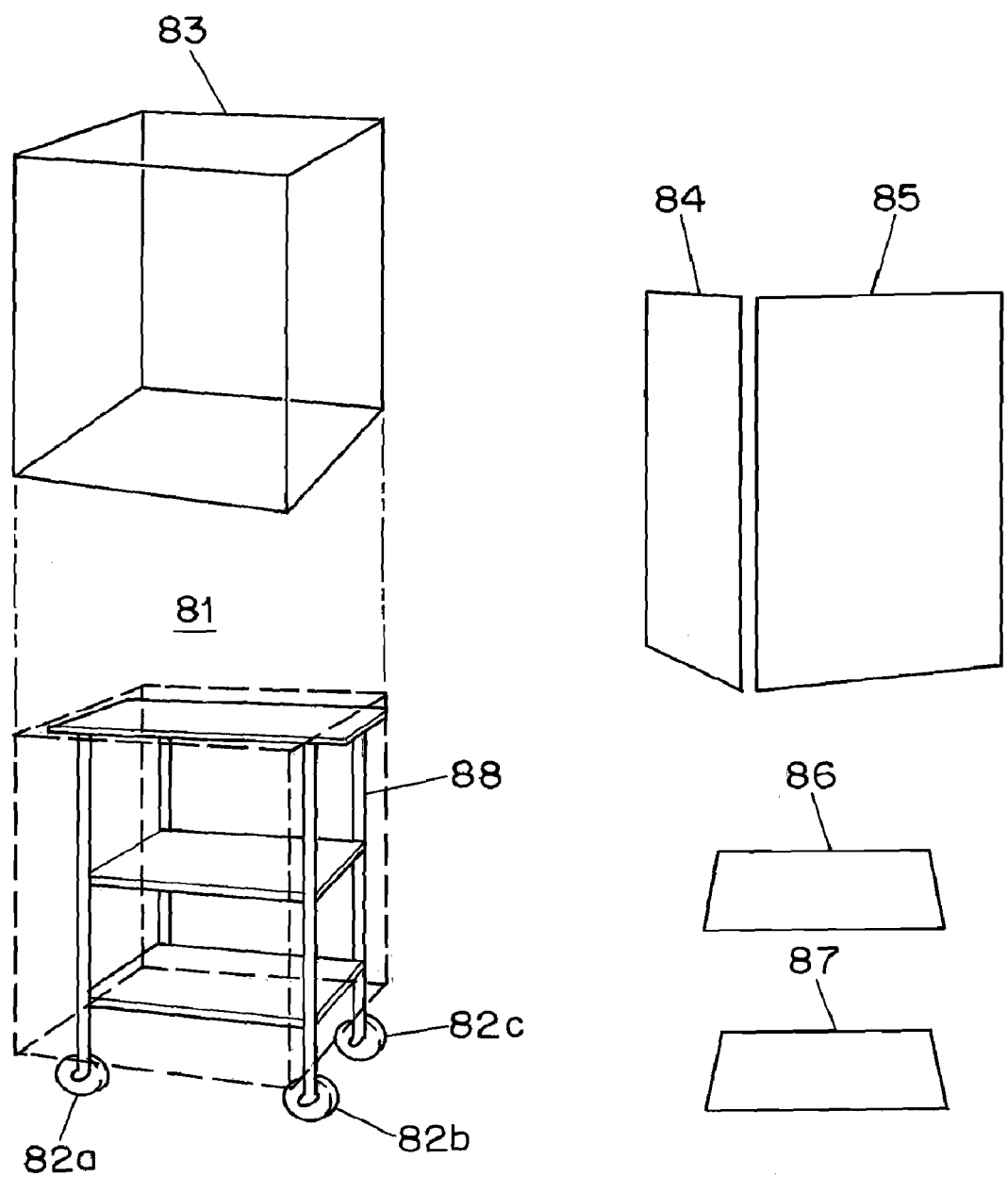
FIG. 8 shows an exemplary cart assembly.

FIG. 8 shows an exemplary cart 81 assembly. It includes a cart 88, and wheels 82a, 82b, and 82c. Superposed on the cart 88 is the cube antenna 83. The cube antenna 83 includes square antennas 84, 85, 86, and 87. Antennas 86 and 87 are parallel with the floor. It is not, of course, required that the antennas be square, and indeed they could be circular in shape or other random shapes. Square antennas are, in some ways, easier to fabricate and to assemble into three axes as portrayed here.

Figure 9:
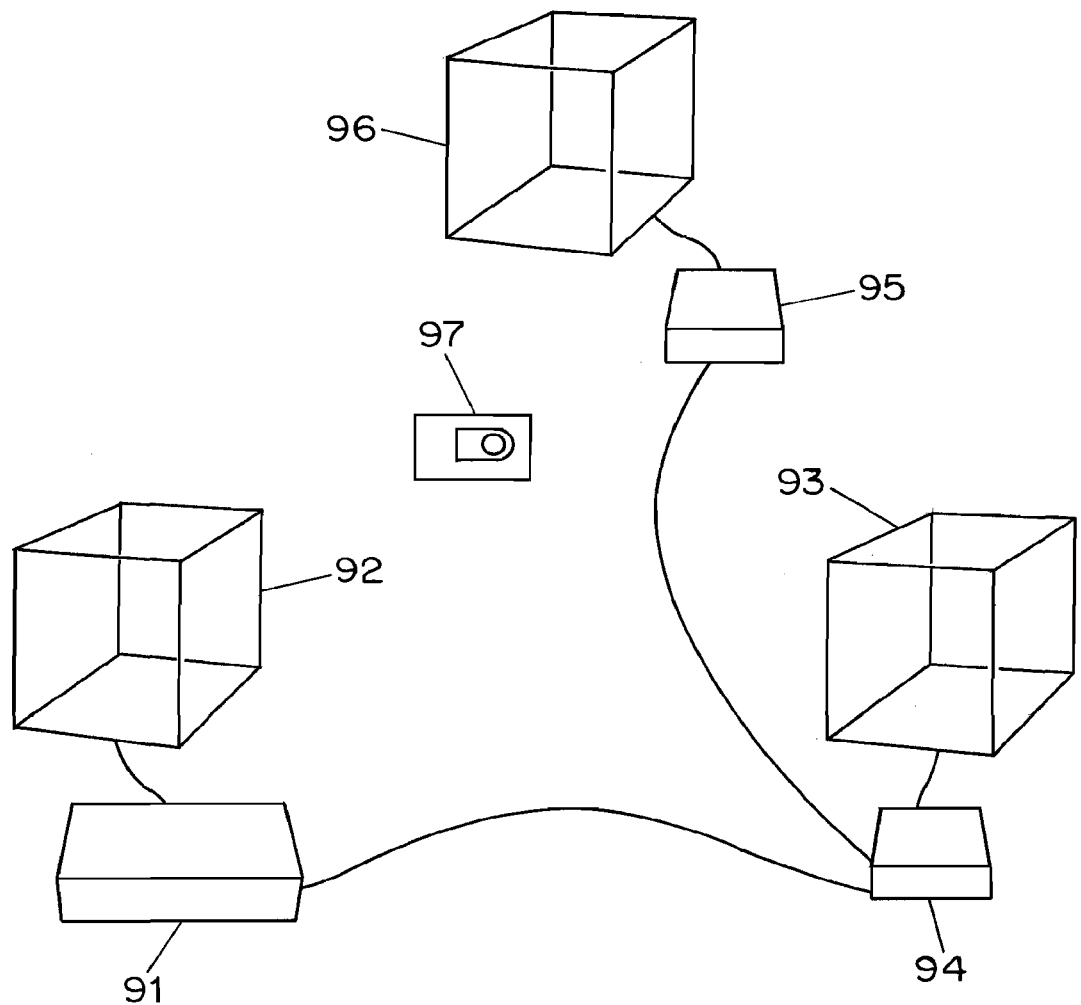
FIG. 9 shows three cube antennas, each connected with a respective router.

FIG. 9 shows three cube antennas 96, 93, and 92, each connected with a respective router 95, 94, and 91. A camera 97 is nearby. The three cube antennas, each with three orthogonal antennas, can detect and localize a tag in five dimensions—3D position as well as tag pitch and yaw. The experimental results suggest a three-dimensional resolution of plus or minus two to six inches, and an angle resolution to within 10 to 20 degrees depending upon the angle.

What follows is one example of a method according to the invention. A building has at least first second, and third rooms. A cart is provided, the cart having at least three wheels, the cart having a first first loop antenna and a radio transceiver, the first loop antenna communicatively coupled with the radio transceiver, the radio transceiver operating at a frequency lower than 1 megahertz, the first first loop antenna having an area greater than 0.2 square meters. The cart is placed in the first room. While the cart is in the first room, the cart communicates by means of the first loop antenna with at least first, second, and third tags, each of the first, second, and third tags being at least five feet from the cart, the communication with the first, second, and third tags achieved without reorienting the first loop antenna, the communication with the first, second, and third tags each yielding an identification of each of the first, second, and third tags. The cart is moved to the second room. While the cart is in the second room, the cart communicates by means of the first loop antenna with at least fourth, fifth, and sixth tags, each of the fourth, fifth, and sixth tags being at least five feet from the cart, the communication with the fourth, fifth, and sixth tags achieved without reorienting the first loop antenna, the communication with the fourth, fifth, and sixth tags each yielding an identification of each of the fourth, fifth, and sixth tags. The cart is moved to the third room. While the cart is in the third room, the cart communicates by means of the first loop antenna with at least seventh, eighth, and ninth tags, each of the seventh, eighth, and ninth tags being at least five feet from the cart, the communication with the seventh, eighth, and ninth tags achieved without reorienting the first loop antenna, the communication with the seventh, eighth, and ninth tags each yielding an identification of each of the seventh, eighth, and ninth tags. The first, fourth, and seventh tags are each fixed respectively to the first, second, and third rooms, whereby the cart is able to know unequivocally which room it is in. The second, third, fifth, sixth, eighth, and ninth tags are each attached to respective movable objects. Optionally, the cart further comprises a second loop antenna not coplanar with the first loop antenna, the second loop antenna communicatively coupled with the radio transceiver, the method further comprising the steps of selectively operatively coupling the first loop antenna and not the second loop antenna to the transceiver; and selectively operatively coupling the second loop antenna and not the first loop antenna to the transceiver.

One application of the system and method according to the invention is corporate inventory control in a building. Instead of, or in addition to, applying traditional numbered or bar-coded inventory labels to assets, RF tags are applied to assets. A cart according to the invention is pushed through the rooms of the building, one by one. The first time through the building is a time-consuming trip as the system must detect and disambiguate all or nearly all of the tags in the building, and associate each tag with a location such as a particular room. Subsequent trips through the building, however, may be faster, since the system can look for a particular tag in a room where it was previously detected, addressing that tag individually and thus saving the step of detecting it by seeking out a tag that had not previously been detected in that room.

It will be appreciated that many tags working at higher frequencies (e.g. the tens of gigahertz used with some RFID tags) are able to be read very quickly, one after the other. In contrast, the system described here is only able to proceed at a bandwidth of a few hundred bits per second. This is not, however, a big problem because the cart can be moved from one room to the next as slowly or as quickly as is needed. In an exemplary embodiment, the cart will have a display showing progress in a particular room, and will let a human operator know when the cart is finished in a room and can be moved to a different room.

In an exemplary embodiment, each room has a fixed tag that permits the cart to know which room it is in. The cart may then enumerate the rooms during an initial trip through the building. On later trips through the building, the cart can "check off" the rooms one by one and can alert the human operator if some particular room is overlooked.

It will be appreciated that in many buildings, there is a cleaning crew which passes through the building periodically, such as daily or every few days. The cleaning cart pushed by the crew can carry the transceiver and antennas described here, and thus represents little or no additional labor cost beyond the fixed labor cost of the cleaning crew.

In a hotel, the cart can be a housekeeping cart pushed by a housekeeper. The cart can, among other things, monitor that nothing has been stolen (e.g. a television or hair dryer or ironing board) as well as monitoring the housekeeping status of each room (not yet cleaned, cleaned for a returning guest, and cleaned for a new check-in).

In a grocery store, a customer grocery cart may may carry the transceiver and antenna described here. If so, the cart can detect fixed-position tags permitting the cart to learn where it is in the store.

In all these cases an exemplary cart will also have an 802.11 b/g wireless node in communication with 802.11 b/g access points located at various positions within the building. By means of a WiFi link the cart (or carts, if there is more than one) can communicate with a central host.

In a building where high-value items are stored, this system will permit real-time or near-real-time visibility of the items. One example is a hospital in which high-value items such as stents or artificial joints are stored. Each stent or joint is tagged with a tag of the type described here, and when a cart according to the invention passes through the room, the stents and joints may be counted and located. Any changes from the previous inventory can be annunciated.

Those skilled in the art will have no difficulty devising myriad obvious variants and improvements upon the invention, all of which are intended to be encompassed by the claims which follow.

The invention claimed is:

1. A method for use with a building comprising at least first second, and third rooms, the method comprising the steps of:
providing a cart, the cart having at least three wheels, the cart having a first loop antenna, a second loop antenna not coplanar with the first loop antenna, and a radio transceiver, the first loop antenna and the second loop antenna communicatively coupled with the radio transceiver, the radio transceiver operating at a frequency lower than 1 megahertz, the first loop antenna having an area greater than 0.2 square meters;
placing the cart in the first room;
while the cart is in the first room, communicating by means of the first loop antenna with at least first, second, and third tags, each of the first, second, and third tags being at least five feet from the cart, the communication with the first, second, and third tags achieved without reorienting the first loop antenna, the communication with the first, second, and third tags each yielding an identification of each of the first, second, and third tags;
moving the cart to the second room;
while the cart is in the second room, communicating by means of the first loop antenna with at least fourth, fifth, and sixth tags, each of the fourth, fifth, and sixth tags being at least five feet from the cart, the communication with the fourth, fifth, and sixth tags achieved without reorienting the first loop antenna, the communication with the fourth, fifth, and sixth tags each yielding an identification of each of the fourth, fifth, and sixth tags;
moving the cart to the third room;
while the cart is in the third room, communicating by means of the first loop antenna with at least seventh, eighth, and ninth tags, each of the seventh, eighth, and ninth tags being at least five feet from the cart, the communication with the seventh, eighth, and ninth tags achieved without reorienting the first loop antenna, the communication with the seventh, eighth, and ninth tags each yielding an identification of the seventh, eighth, and ninth tags;
selectively operatively coupling the first loop antenna and not the second loop antenna to the transceiver; and
selectively operatively coupling the second loop antenna and not the first loop antenna to the transceiver.

2. The method of claim 1 wherein the first, fourth, and seventh tags are each fixed respectively to the first, second, and third rooms, and wherein the second, third, fifth, sixth, eighth, and ninth tags are each attached to respective movable objects.

3. The method of claim 1 further comprising the steps of:
when the cart is in the first room, cleaning the first room;
when the cart is in the second room, cleaning the second room; and
when the cart is in the third room, cleaning the third room.

4. A system for use in a building, the building having at least first, second, and third rooms, the system comprising:
a cart, the cart having at least three wheels, the cart having a first loop antenna, a second loop antenna not coplanar with the first loop antenna, and a radio transceiver, the first loop antenna and the second loop antenna communicatively coupled with the radio transceiver, the radio transceiver operating at a frequency lower than 1 megahertz, the first loop antenna having an area greater than 0.2 square meters;
in the first room, at least first, second, and third radio tags, each disposed to receive signals from the cart at a frequency lower than 1 megahertz, each of the first, second, and third tags being at least five feet from the cart, the communication with the first, second, and third tags achieved without reorienting the first loop antenna, the communication with the first, second, and third tags each yielding an identification of each of the first, second, and third tags, each of the first, second, and third radio tags in radio communication with the cart when the cart is in the first room;

in the second room, at least fourth, fifth, and sixth radio tags, each disposed to receive signals from the cart at a frequency lower than 1 megahertz, each of the fourth, fifth, and sixth tags being at least five feet from the cart, the communication with the fourth, fifth, and sixth tags achieved without reorienting the first loop antenna, the communication with the fourth, fifth, and sixth tags each yielding an identification of each of the fourth, fifth, and sixth tags, each of the fourth, fifth, and sixth radio tags in radio communication with the cart when the cart is in the second room; and in the third room, at least sixth, seventh, and eighth radio tags, each disposed to receive signals from the cart at a frequency lower than 1 megahertz, each of the seventh, eighth, and ninth tags being at least five feet from the cart, the communication with the seventh, eighth, and ninth tags achieved without reorienting the first loop antenna, the communication with the seventh, eighth, and ninth tags each yielding an identification of the seventh, eighth, and ninth tags, each of the sixth, seventh, and eighth radio tags in radio communication with the cart when the cart is in the third room, wherein the first loop antenna and the second loop antenna are selectively operatively coupled to the transceiver to couple the first loop antenna and not the second loop antenna to the transceiver or to couple the second loop antenna and not the first loop antenna to the transceiver.

5. The system of claim 4 wherein the first, fourth, and seventh tags are each fixed respectively to the first, second, and third rooms, and wherein the second, third, fifth, eighth, and ninth tags are each attached to respective movable objects.

6. The system of claim 4 wherein the cart further comprises cleaning supplies.

7. The system of claim 4 wherein the cart further comprises a holder for a trash bag.

\* \* \* \* \*